United States Patent [19]

Tabata

[11] Patent Number: 5,054,752
[45] Date of Patent: Oct. 8, 1991

[54] FLUID-FILLED POWER UNIT MOUNT

[75] Inventor: Toshiyuki Tabata, Sagamihara City, Japan

[73] Assignee: Nissan Motor Co., Ltd., Yokohama City, Japan

[21] Appl. No.: 608,625

[22] Filed: Oct. 30, 1990

Related U.S. Application Data

[63] Continuation of Ser. No. 391,384, Aug. 9, 1989, abandoned, which is a continuation of Ser. No. 136,801, Dec. 22, 1987, abandoned.

[30] Foreign Application Priority Data

Dec. 23, 1986 [JP] Japan ............................. 61-306760

[51] Int. Cl.$^5$ ........................... F16F 1/38; F16F 13/00
[52] U.S. Cl. ................................. 267/140.1; 180/312; 248/562; 248/636; 267/219
[58] Field of Search .................. 267/140.1 R, 140.1 C, 267/219, 220; 180/300, 312, 902; 248/562, 634, 636

[56] References Cited

U.S. PATENT DOCUMENTS

| | | |
|---|---|---|
| 4,159,091 | 6/1979 | Le Salver et al. ............ 267/140.1 X |
| 4,383,679 | 5/1983 | Kakimoto ..................... 267/140.1 X |
| 4,391,435 | 7/1983 | Pham ............................ 267/140.1 |
| 4,595,183 | 6/1986 | Dan et al. ..................... 267/140.1 A |
| 4,690,389 | 9/1987 | West ............................. 267/140.1 |
| 4,693,456 | 9/1987 | Kanda ........................... 267/140.1 |
| 4,705,410 | 11/1987 | Broock ......................... 267/140.4 X |
| 4,728,086 | 3/1988 | Ishiyama et al. ............. 267/140.1 |
| 4,838,529 | 6/1989 | Orikawa et al. ............. 267/140.1 C |

FOREIGN PATENT DOCUMENTS

| | | |
|---|---|---|
| 0172700 | 2/1986 | European Pat. Off. . |
| 159435 | 8/1985 | Japan ............................ 267/140.1 A |
| 168932 | 9/1985 | Japan ............................ 267/140.1 |
| 188638 | 9/1985 | Japan ............................ 267/140.1 |
| 192139 | 9/1985 | Japan ............................ 267/140.1 |
| 61-65935 | 4/1986 | Japan . |
| 206838 | 9/1986 | Japan ............................ 267/140.1 |
| 2192968 | 1/1988 | United Kingdom . |

Primary Examiner—George E. A. Halvosa
Attorney, Agent, or Firm—Foley & Lardner

[57] ABSTRACT

A power unit mount through which a power unit is mounted on a vehicle body. The power unit mount is comprised of an elastic support member securely disposed between inner and outer cylindrical members which are respectively connected to the power unit and the vehicle body. The elastic support member is formed with a hollow a part of which serves as a main fluid chamber. A diaphragm member is secured to the inner peripheral surface of the outer cylindrical member to define an auxiliary fluid chamber which is communicated through an orifice passage to the main fluid chamber. The diaphragm member is disposed separate and independent from the elastic support member, thereby enabling damped vibration frequencies to be tuned within a low frequency region corresponding to engine shake and/or idling vibration, regardless of the rigidity of the elastic support member.

24 Claims, 10 Drawing Sheets

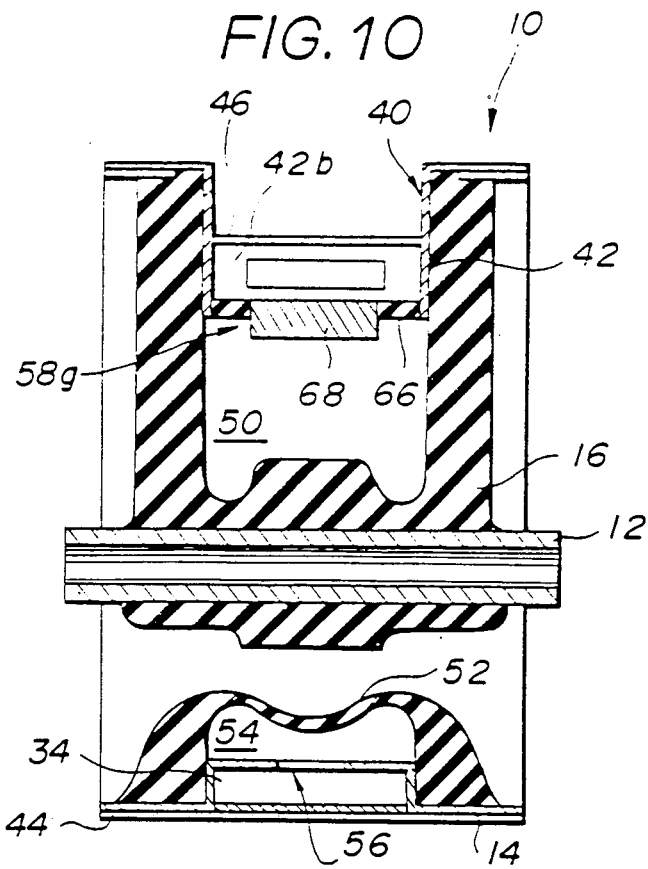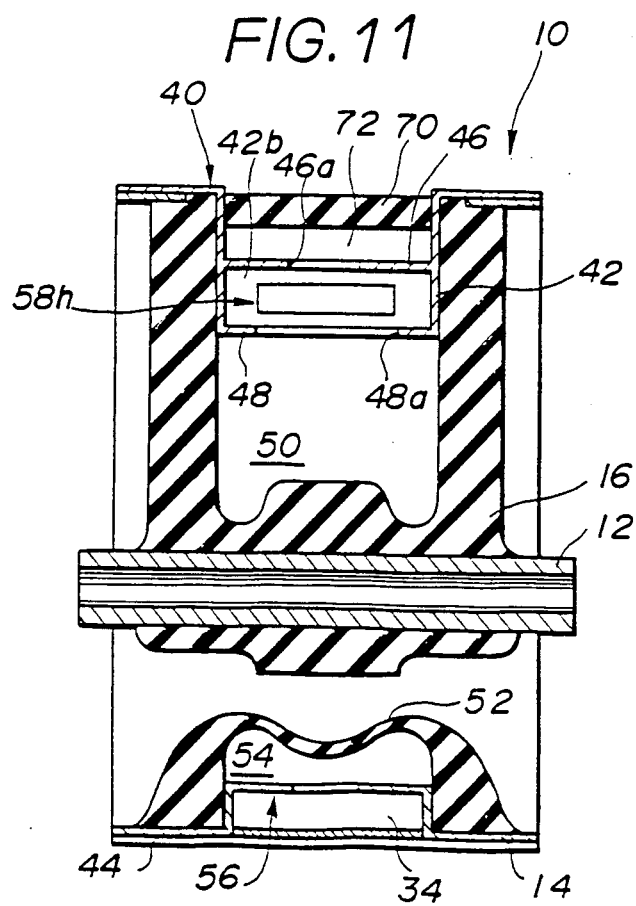

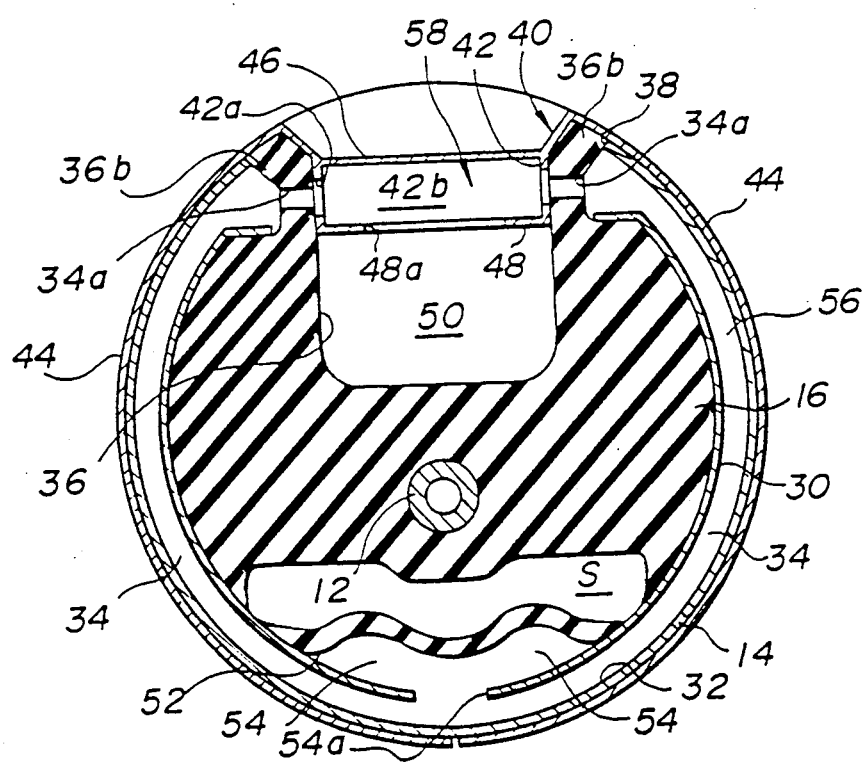

FLUID-FILLED POWER UNIT MOUNT

This application is a continuation of application Ser. No. 391,384, filed Aug. 9, 1989.

BACKGROUND OF THE INVENTION

1. Field of the Invention

The present invention relates to a fluid-filled power unit mount through which a power unit of a vehicle is mounted on a vehicle body, and more particularly to such a power unit mount of the type wherein an elastic support member is securely disposed between inner and outer cylinderical members and formed with a chamber filled with a fluid for damping vibration.

2. Description of the Prior Art

In general, a power unit constituted of an engine and a transmission is supported through power unit mounts (engine mounts) on a vehicle body in order to prevent engine vibration and the like from being transmitted to the vehicle body. Such a power unit mount usually includes an elastic support member made of rubber or the like and securely put between two attachment members which are respectively connected to the vehicle body and the power unit. However, with such a power unit mount, there is possibility of the elastic member being broken and cut into two by any cause. In order to overcome this difficulty and to make the power unit mount small-sized, a power unit mount of so-called inner-outer cylinder type has been proposed and put into practical use in which an elastic support member is securely disposed between inner and outer cylinders. The inner cylinder is connected to one of a power unit and a vehicle body, while the outer cylinder is connected to the other of them. With the thus configured power unit mount, the load of the power unit is supported by the elastic member, and the inner cylinder is prevented from getting out of the outer cylinder even if the elastic member is broken and cut into two because the inner cylinder is surrounded by the outer cylinder.

Such an inner-outer cylinder type power unit mount is disclosed, for example, in Japanese Patent Provisional Publication No. 61-65935. In this power unit mount, the elastic support member between the inner and outer cylinders is formed with two fluid chambers which are located opposite with respect to the inner cylinder and communicated with each other through an orifice formed in a block securely mounted on the inner cylinder. Accordingly, when relative displacement between the inner and outer cylinders is made along with vibration of the power unit, the elastic support member deforms so that one fluid chamber expands simultaneously with contraction of the other fluid chamber, thereby causing the fluid within the fluid chambers to move through the orifice. This damps vibration of the power unit.

However, in such a power unit mount, the respective fluid chambers are formed in the elastic support member such that the elastic support member itself serves as side wall of the fluid chambers. Additionally, the elastic support member is required to support a larger load of the power unit and therefore necessarily has a larger spring constant, thereby unavoidably raising the spring constant due to expansion elasticity of the fluid chambers. Consequently, vibration frequencies to be damped by the vibration damping mechanism constituted by the fluid chambers and the orifice unavoidably fall within a relatively high frequency region which is far from a relatively low frequency region such as of engine shake and/or idling vibration. Thus, it is impossible to effectively suppress engine shake and idling vibration, and therefore low frequency vibration is still allowed to be input to the vehicle body, thereby deteriorating ride-on feeling of the vehicle. Furthermore, because of the orifice being formed in the block securely attached to the block, increasing the opening sectional area of the orifice is restricted thereby to minimize the orifice sectional area. Therefore, there is possibility of the liquid in the orifice sticking during high frequency vibration. As a result, vibration damping in a high frequency region also cannot be effectively achieved.

SUMMARY OF THE INVENTION

A power unit mount of the present invention is comprised of an elastic support member securely disposed between an inner elongate member and an outer cylindrical member. The inner elongate member is connected to one of a power unit and a vehicle body of a vehicle, while the outer cylindrical member is connected to the other of them. The elastic support member functions to support load of the power unit and is formed with a hollow defining therein a main fluid chamber. Additionally, a diaphragm member is disposed to define an auxiliary fluid chamber. The auxiliary fluid chamber is communicated through an orifice passage with the main fluid chamber. The orifice forms part of a main vibration damping mechanism for damping vibration in a first frequency region. Optionally, the power unit mount is provided with an auxiliary damping vibration mechanism for damping vibration in a second frequency region which is different from the first frequency region. The auxiliary vibration damping mechanism is located in the elastic support member hollow and incorporates with the main fluid chamber.

Accordingly, when relative displacement between the inner elongate member and the outer cylindrical member is made along with vibration of the power unit, the elastic support member deforms to change the volume of the main fluid chamber with the result that fluid within the main fluid chamber moves between the main and auxiliary fluid chambers through the orifice passage, thus causing the main vibration damping mechanism to function. Now, since the auxiliary fluid chamber is formed separate from the elastic support member, the spring constant of the diaphragm member is made considerably smaller regardless of the rigidity or spring constant of the elastic support member, thereby enabling frequencies of damped vibration to be tuned to fall within a low frequency region corresponding to engine shake and/or idling vibration. Thus, engine shake and idling vibration transmitted from the power unit are effectively damped by the power unit mount. Furthermore, by virtue of the optionally provided auxiliary vibration damping mechanism, vibration in a high frequency region can be also effectively damped, thus considerably enlarging region of vibration frequencies damped by the single power unit mount.

BRIEF DESCRIPTION OF THE DRAWINGS

In the drawings, like reference numerals and characters designate like parts and elements, in which:

FIG. 10 is a vertical sectional view similar to FIG. 1 but showing a sixth embodiment of the power unit mount of the present invention;

FIG. 11 is a vertical sectional view similar to FIG. 1 but showing a seventh embodiment of the power unit mount of the present invention;

FIG. 15 is a vertical sectional view similar to FIG. 2 but showing an eleventh embodiment of the power unit mount of the present invention.

DETAILED DESCRIPTION OF THE INVENTION

Figure 1:
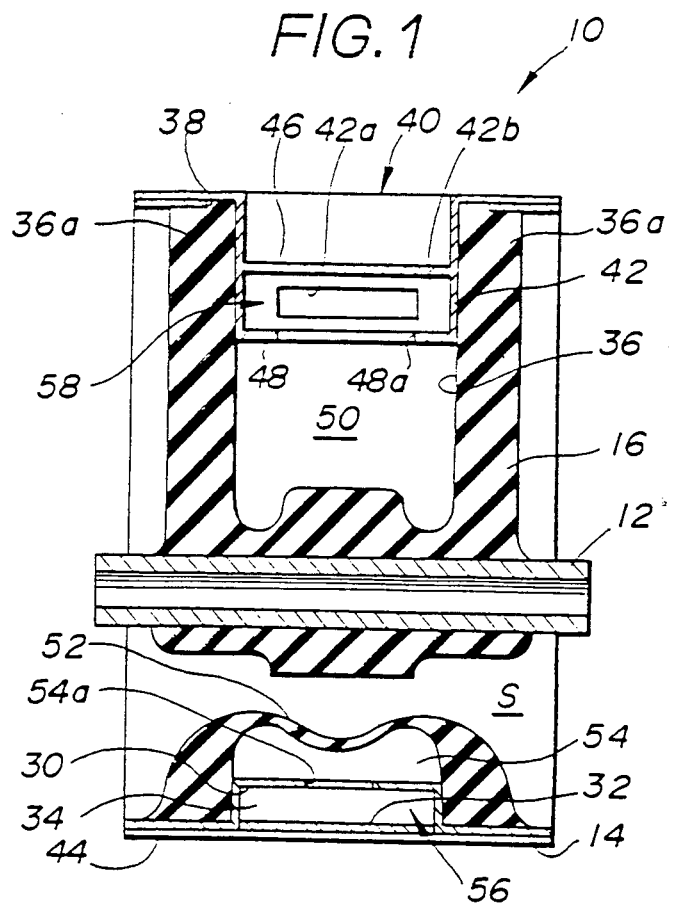
FIG. 1 is a vertical sectional view of a first embodiment of a power unit mount of the present invention, taken along a plane parallel with the axis of the power unit mount.

Referring now to FIGS. 1, 2, 3 and 4 of the drawings, a first embodiment of a fluid-filled power unit mount according to the present invention is illustrated by the reference numeral 10. The power unit 10 of this embodiment is used in an automotive vehicle and comprises an elastic support member 16 disposed between a rigid inner cylindrical member 12 and a rigid outer cylindrical member 14 in a manner to elastically connect the inner and outer cylindrical members 12, 14. More specifically, the inner cylindrical member 12 is disposed to be surrounded by the outer cylindrical member 14 such that the axes of the inner and outer cylindrical members 12, 14 are generally parallel with each other. The elastic support member 16 is made of elastomeric material such as rubber and disposed within the outer cylindrical member 14 so as to be fixedly secured to the inner surface of the outer cylindrical member 14. The inner cylindrical member 12 pierces the elastic support member 16 and is fixedly secured at its outer surface to the support member 16, so that the inner cylindrical member 12 is movable through the elastic support member 16 relative to the outer cylindrical member 14.

Figure 5:
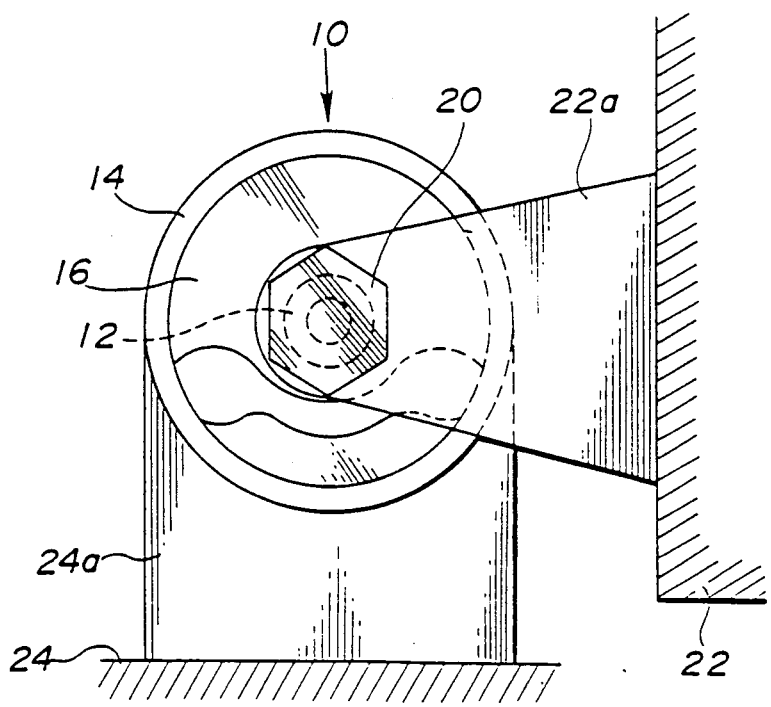
FIG. 5 is a schematic illustration showing installation state of the power unit mount of FIGS. 1 and 2.

As shown in FIG. 5, the opposite ends of the inner cylindrical member 12 are fixedly secured respectively to brackets 22a, 22a, through bolts 20, 20 threaded into the inner cylindrical member 12. The brackets 22a, 22a project from the side of a power unit 22 of the vehicle to the opposite sides of the power unit mount 10 in such a manner that the inner cylindrical member 12 is put between the brackets 22a, 22a. The outer cylindrical member 14 is fixedly connected through a bracket 24a with a vehicle body member 24 forming part of a vehicle body of the vehicle. It will be understood that the inner cylindrical member 12 may be connected to the side of the vehicle body 24, and the outer cylindrical member 14 may be connected to the side of the power unit 22.

The outer cylindrical member 14 is formed on its outer periphery with an elongate groove 30 extending along the periphery of the outer cylindrical member 14. The groove 30 is defined by a radially inwardly depressed section 14a, having a generally C-shaped cross-section, of the outer cylindrical member 14. The depressed section 14a is located at the central part of the outer cylindrical member 12 in the axial direction. More specifically, as best seen from FIG. 3, the outer cylindrical member 14 includes two opposite flat side sections 14b, 14b located opposite to each other with respect to the depressed section 14a. The depressed section 14a includes two opposite vertical wall portions $P_1$, $P_1$ which are respectively integral with the flat side sections 14b, 14b. The vertical wall portions $P_1$, $P_1$ are integrally connected by a bottom wall portion $P_2$. A closure plate 32 is provided to cover the groove 30 maintaining a fluid tight seal, and securely attached to the surface of the outer cylindrical member 14 in such a manner that its outer surface is flush with the outer surface of the side sections 14b of the outer cylindrical member 14a.

Figure 3:
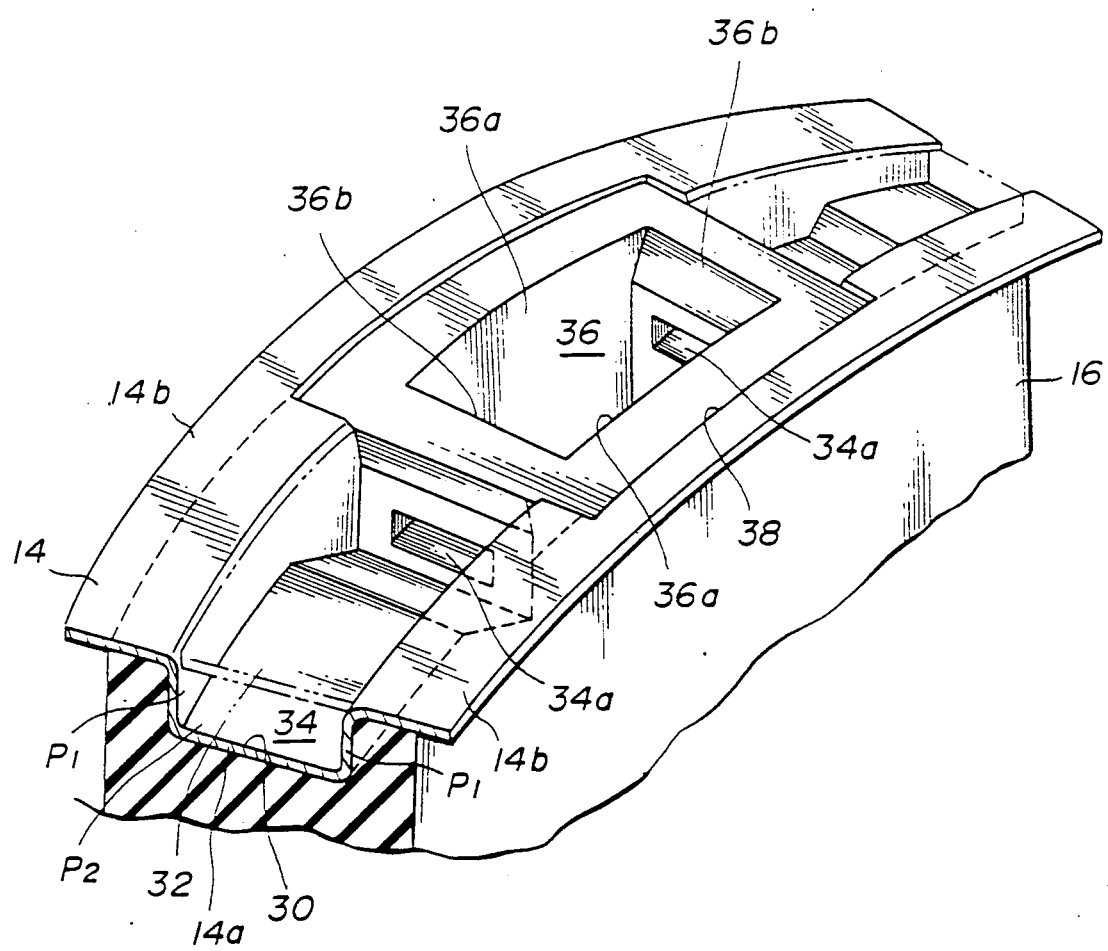
FIG. 3 is a fragmentary perspective view of a part of the power unit mount of FIGS. 1 and 2.

The elastic support member 16 is formed with a hollow 36 located above the inner cylindrical member 12 in the drawings. In this connection, the outer cylinder member 14 is formed with a rectangular opening 38 as best shown in FIG. 3, which opening is located corresponding to the hollow 36 of the support member 16 and having a cross-sectional area larger than that of the hollow 36. The opening 38 is formed by cutting out a part of the depressed section 14a and a part of the side sections 14b, 14b of the outer cylindrical member 14, so that two generally C-shaped sections of the outer cylindrical member 14 are exposed on the opposite sides of the opening 38 in the peripheral direction. The hollow 36 of the elastic support member 16 is formed to open upwardly through the opening 38 of the outer cylindrical member 14, and its upper part is rectangular in cross-section and defined by opposite side wall sections 36a, 36a and opposite front and rear wall sections 36b, 36b. The side wall sections 36a, 36a are located generally parallel with and spaced from each other in the axial direction of the outer cylindrical member 14, while the front and rear wall sections 36b, 36b are located generally parallel with and spaced from each other in the peripheral direction of the outer cylindrical member 14. The upper end portion of the wall sections 36a, 36b is fitted to the periphery of the opening 38, so that one of the above-mentioned two generally C-shaped sections of the outer cylindrical member 14 fits to the front wall section 36b of the elastic support member 16, while the other fits to the rear wall section 36b of the same. Accordingly, the orifice passage 34 is communicated with the hollow 36 through communication openings 34a, 34a which are formed respectively in the front and rear side wall sections 36b, 36b of the elastic support member 16. It will be understood that sufficient fluid tight seal is maintained at joint between the outer cylindrical member 14 and the elastic support member 16 since the outer cylindrical member 14 tightly fits to the elastic support member 16.

Figure 4:
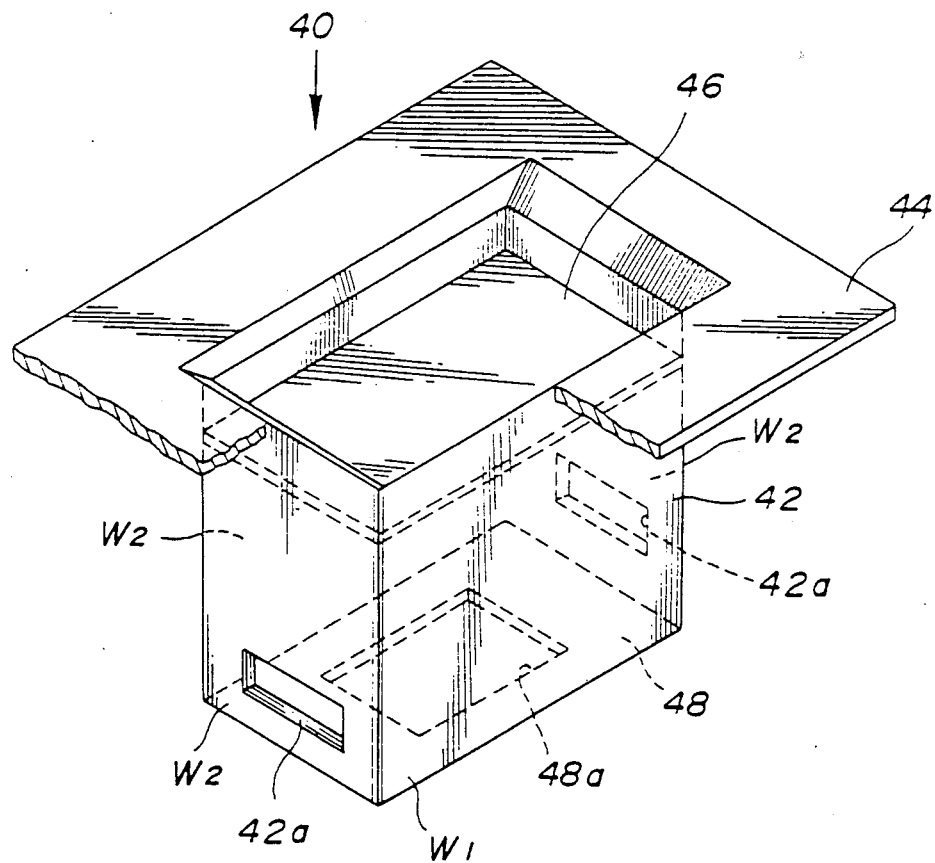
FIG. 4 is a fragmentary perspective view of another part of the power unit of FIGS. 1 and 2.

A closure body 40 shown in FIG. 4 is provided to cover the upper open section of the hollow 36 of the elastic support member 16, and includes a hollow rectangular parallel piped box member 42 inserted into and tightly fitted in the hollow 36 of the elastic support member 16. The box member 42 includes two opposite side wall sections $W_1$, $W_1$ which are parallel with and spaced from each other, and front and rear opposite side wall sections $W_2$, $W_2$ which are parallel with and spaced from each other. The box member 42 is closed at its upper part with a lid plate 46, and provided at its bottom with a bottom plate 48 which is formed with an opening 48a. Additionally, the box member 42 is provided at its upper end with a flange 44 to surround the upper periphery of the box member 42. The flange 44 extends long particularly in the direction of the axis of the box member 42 passing through the front and rear wall sections $W_2$, $W_2$. After insertion of the box member 42 into the hollow 36 of the elastic support member 16, the side wall sections $W_1$, $W_1$ are respectively in contact with the side wall sections 36a, 36a of the elastic support member 16, while the front and rear wall sections $W_2$, $W_2$ are respectively in contact with the front and rear wall sections 36b, 36b of the elastic support member 16. The front and rear wall sections $W_2$, $W_2$ are respectively formed with openings 42a, 42a which are coincident respectively with the communication openings 34a, 34a of the front and rear wall sections 36b, 36b of the elastic support member 16. Accordingly, the orifice passage 34 is in communication with the inside space of the box member 42 through the communication opening 34a and the opening 42a.

Figure 2:
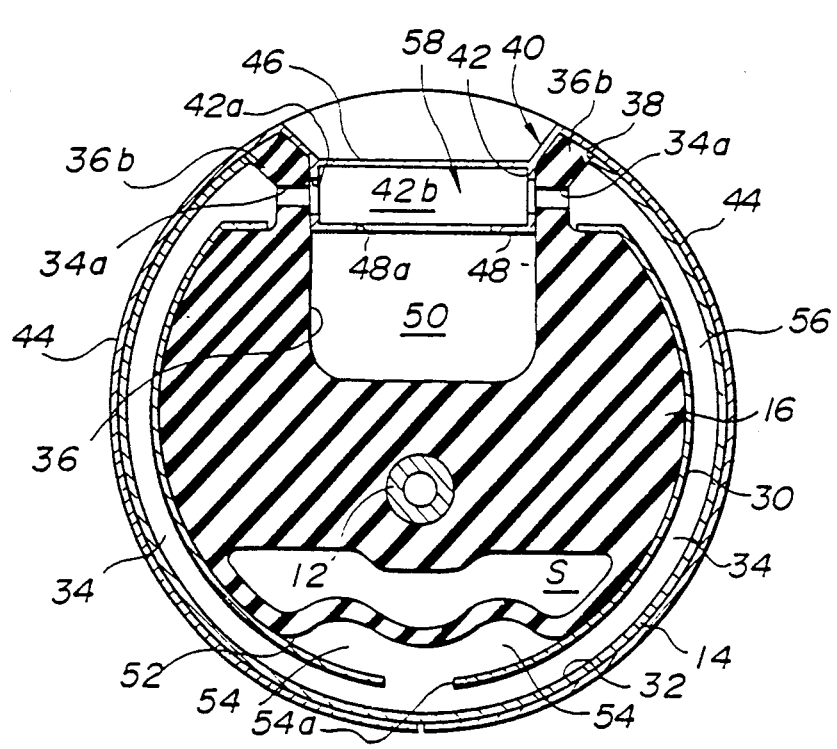
FIG. 2 is a vertical sectional view of the power unit mount of FIG. 1, taken along a plane to which the axis of the power unit mount is perpendicular.

The flange 44 is put around the outer periphery of the outer cylindrical member 14 as best seen from FIG. 2 and secured in this state by caulking after insertion of the box member 42 of the closure body 40 into the hollow 46 of the elastic support member 16. Such securing of the closure body 40 in position is carried out in a state in which the hollow 36, the orifice passage 34 and an auxiliary fluid chamber 54 (discussed after) are filled with liquid such as water, in which the liquid is hermetically confined in the power unit mount 10 with the closure body 40. A lower part of the hollow 36 filled with the liquid serves as a main fluid chamber 50 whose volume will change with deformation of the elastic support member caused by relative displacement between the inner and outer cylindrical members 12, 14.

As shown, the lower section (in the drawings) of the elastic support member 16 is cut off leaving a sufficient volume of the elastic material to securely support the inner cylindrical member 12. Accordingly, a relatively large space S is formed between the lower end of the elastic support member 16 and the inner periphery of the outer cylindrical member 14. Within the space S, a diaphragm member 52 is located and securely attached to the inner peripheral surface of the outer cylindrical member 14 in such a manner to cover the inner surface of the depressed section 14a of the outer cylindrical member 14, thereby defining the above-mentioned auxiliary liquid chamber 54 between the diaphragm member 52 and the depressed section 14a of the outer cylindrical member 14. The auxiliary liquid chamber 54 is filled with the liquid as discussed above and is communicated with the orifice passage 34 through an opening 54a formed in the depressed section 14a of the outer cylindrical member 14. Consequently, the liquid within the main fluid chamber 50 moves through the orifice passages 34 to the auxiliary fluid chamber 54 and vice versa. Thus, the main fluid chamber 50, the orifice passage 34 and the auxiliary fluid chamber 54 constitute a main vibration damping mechanism 56. As shown in FIGS. 1 and 2, a fluid chamber 42b is formed between the lid plate 46 and the bottom plate 48 of the closure body box member 42. It is to be noted that an auxiliary vibration damping mechanism 58 is constituted between the fluid chamber 42b and the main fluid chamber 50 below the bottom plate 48 in which the opening 48a of the bottom plate 48 serves as an orifice.

The operation of the thus configured power unit mount will be discussed hereinafter.

When relative displacement is made between the inner and outer cylindrical members 12, 14 along with vibration of the power unit 22, the volume of the main fluid chamber 50 changes. During vibration of the power unit 22 in a low frequency and large amplitude region such as during engine shake (having frequencies of about 5 to 15 Hz) or idling vibration (having frequencies of about 20 to 40 Hz), the liquid within the main fluid chamber 50 moves between the main and auxiliary fluid chambers 50, 54 through the orifice passage 34 so that the main vibration damping mechanism 56 functions. At this time, the main damping mechanism 56 exhibits so-called liquid column resonance phenomena in which the mass (m) of the liquid moving in the orifice passage 34 serves as "mass" of vibration system; the extension elasticity (K) of side wall defining the main fluid chamber 54 and the expansion elasticity (k) of the diaphragm member 52 serve as "spring", in which resonance frequency $f_0$ is given by the following equation (1):

$$f_0 \propto \sqrt{\frac{K+k}{m}} \quad (1)$$

Accordingly, setting the resonance frequency $f_0$ within a vibration suppressing region of the power unit 22 can effectively damp vibration transmitted from the power unit 22 to the vehicle body side, i.e., lowers transmissibility of vibration transmitted from the power unit 22 to the vehicle body 22 under so-called dynamic damper action.

Now, since the main fluid chamber 50 of this embodiment is defined by the elastic support member 16 for supporting the load of the power unit 22, the extension elasticity or spring constant (K) of the above-mentioned side wall is necessarily set at a larger value. However, the diaphragm member 52 for the auxiliary fluid chamber 54 is separate from the elastic support member 16, its extension elasticity or spring constant (k) can be set at a smaller value regardless of the larger spring constant of the elastic support member 16. Consequently, as apparent from the above equation (1), the resonance frequency $f_0$ in the main vibration damping mechanism 56 can be set at a lower value.

Furthermore, since the orifice passage 34 is formed at the depressed section 14a of the outer cylindrical member 14, the length of the orifice passage 34 is set larger while increasing the cross-sectional area of the orifice passage 34. As a result, the liquid mass (m) moving through the orifice passage 34 is necessarily enlarged, so that the resonance frequency $f_0$ can be further lowered as seen from the equation (1). It will be seen from FIG. 2, that the orifice passages 34 includes a pair of arcuate fluid passages which are formed opposite to each other with respect to an imaginary vertical plane (not identified) in FIG. 2 on which plane the axis of the inner cylindrical member 12 lies.

Thus, according to the above discussed embodiment, separately disposing the diaphragm member 52 from the elastic support member 16 can lower the total extension elasticity of the main vibration damping mechanism 56, thereby lowering the resonance frequency of the main vibration damping mechanism 56. Accordingly, frequencies to be damped, of the power unit 22 can be in a lower frequency region corresponding to engine shake and/or idling vibration. Additionally, increasing the liquid mass within the orifice passage 34 can greatly increase the tuning range of the low frequency region to be damped.

Next when the power unit 22 generates high frequency and small amplitude vibration such as vibration (having frequencies of about 100 to 200 Hz) causing booming noise within a passenger compartment and/or engine combustion noise (having frequencies of about 200 to 400 Hz), such high frequency and large amplitude vibration is input to the power unit mount 10 so that the volume of the main fluid chamber 50 changes in relation to the high frequency amplitude. At this time, the liquid in the orifice passage 34 is brought into its sticked state to be prevented from moving because the orifice passage 34 of the main vibration damping mechanism 56 is formed longer, so that the main vibration damping mechanism 56 does not function. However, the liquid within the main fluid chamber 50 can freely move between the main fluid chamber 50 and the fluid chamber 42b even within the high frequency and small amplitude vibration region, because the opening 48a serving as the orifice of the auxiliary vibration damping mechanism 58 is larger in opening cross-sectional area and smaller in length corresponding to the thickness of the bottom plate 48 of the box member 42. It will be understood that free liquid movement is made through the opening 48a even in the low frequency and large amplitude vibration region.

Thus, liquid column resonance is caused upon the liquid passing through the opening 48a, and therefore the auxiliary vibration damping mechanism 58 functions in the high frequency and small amplitude region, so that lowering in vibration transmissibility can be accomplished like in the main vibration damping mechanism 56, in the relationship between the expansion elasticity of the side walls of the main fluid chamber 50 and the liquid mass passing through the opening 48a. Accordingly, tuning the frequency of this liquid column resonance within the above-mentioned high frequency and small amplitude frequency region enables the single power unit mount 10 to achieve vibration damping in different frequency regions. In other words, the single power unit mount 10 accomplishes vibration damping within a lower frequency region by its main vibration damping mechanism 56, and vibration damping within a high frequency region by its auxiliary vibration damping mechanism 58, thus achieving effective interruption or sharp reduction of input of engine shake, idling vibration and engine combustion noise to the vehicle body and preventing booming noise from occuring within the passenger compartment.

Figure 6A:
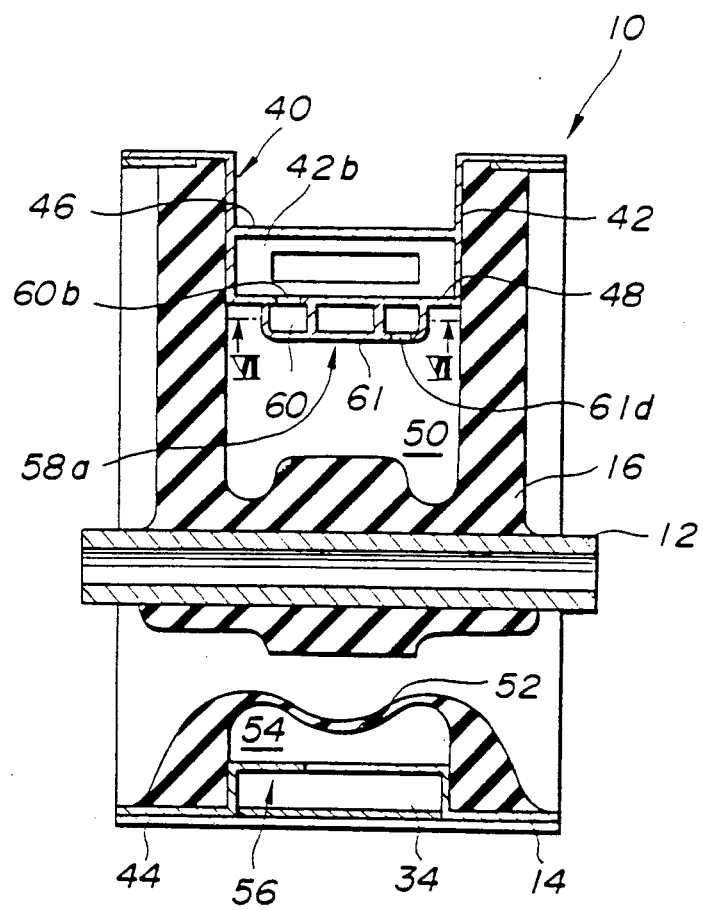
FIG. 6A is a vertical sectional view similar to FIG. 1 but showing a second embodiment of the power unit mount of the present invention.
Figure 6B:
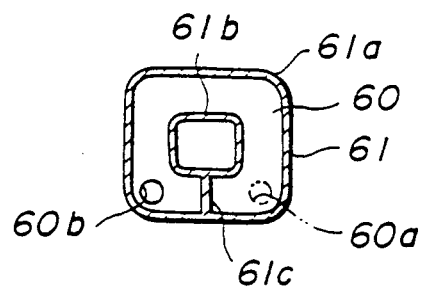
FIG. 6B is a cross-sectional view taken in the direction of arrows substantially along the line VI—VI of FIG. 6A.

FIGS. 6A and 6B illustrate a second embodiment of the power unit mount of the present invention, similar to the first embodiment except for the bottom plate 48 of the closure body box member 42. In this embodiment, the bottom plate 48 is provided with a wall structure 61 includes an outer wall 61a, an inner wall 61b, and a connecting wall 61c connecting the inner and outer walls, which walls are integrally interposed between the bottom plate 48 and a bottom wall 61d of the wall structure 61. As shown, the wall structure bottom wall 61d is formed with an opening 60a located near the connecting wall 61c, while the box member bottom plate 48 is formed with an opening 60b located near the connecting wall 61c. The openings 60a, 60b are opposite to each other with respect to the connecting wall 61c. Thus, the elongate orifice passage 60 is formed between the outer and inner walls 61a, 61b and communicates through the opening 61a with the main fluid chamber 50 and through the opening 60b with the fluid chamber 42b. Accordingly, with this arrangement, the longer orifice passage 60 is formed between the main fluid chamber 50 and the fluid chamber 42b, thereby enabling the damped frequency range to fall within a relatively low frequency region.

Figure 7:
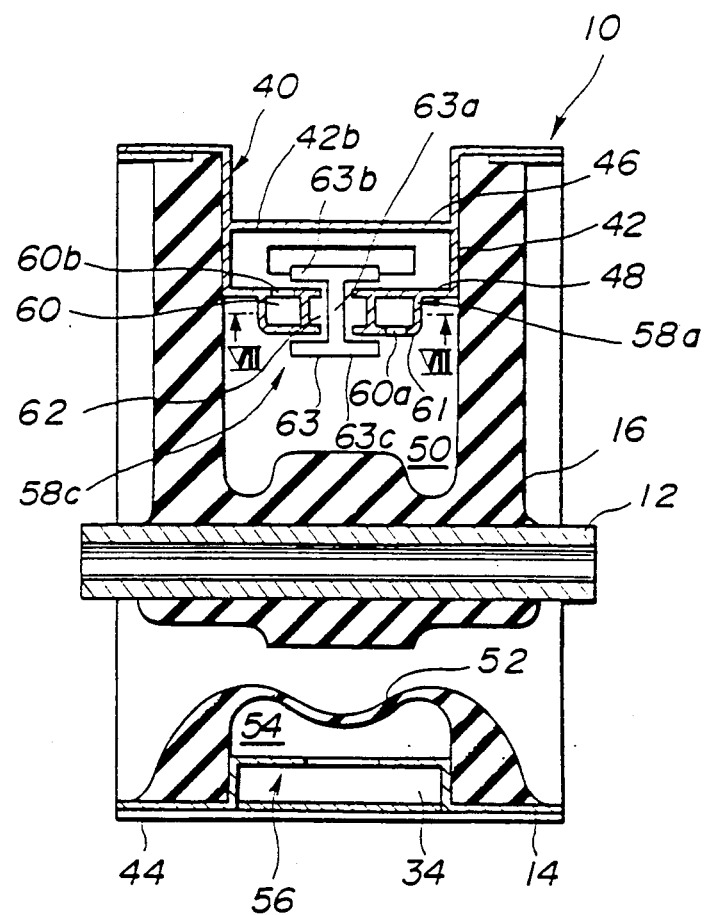
FIG. 7A is a vertical sectional view similar to FIG. 1 but showing a third embodiment of the power unit mount of the present invention.
FIG. 7B is a cross-sectional view taken in the direction of arrows substantially along the line VII—VII of FIG. 7A.
Figure 7:
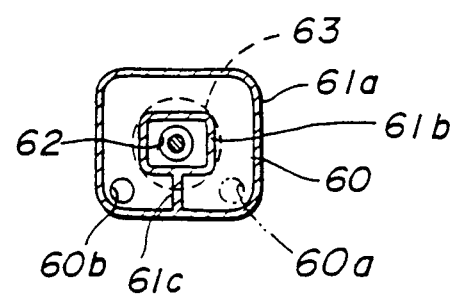

FIGS. 7A and 7B illustrate a third embodiment of the power unit mount 10 in accordance with the invention, similar to the second embodiment. In this embodiment, an opening (no numeral) is formed at the central part of the box member bottom plate 48 and of the wall structure bottom wall 61 defined inside the wall structure inner wall 61b, thereby forming a communication opening 62 through which the main fluid chamber 50 and the fluid chamber 42b are communicated with each other. A valve member 63 is provided such that its rod 63a is loosely fits in the communication opening 62. The valve member 63 has an upper disc 63b located in the fluid chamber 42b, and a lower disc 63c located in the main fluid chamber 50. The upper and lower discs 63b, 63c are connected by the rod 63a in such a manner as to allow a slight axial movement of the valve member 63. Accordingly, with this arrangement, the orifice passage 60 constitutes one auxiliary vibration damping mechanism 58a, while the valve member 63 and the communication opening 62 constitute another auxiliary vibration damping mechanism 58c by which damped vibration falls within a relatively high frequency region.

Figure 8:
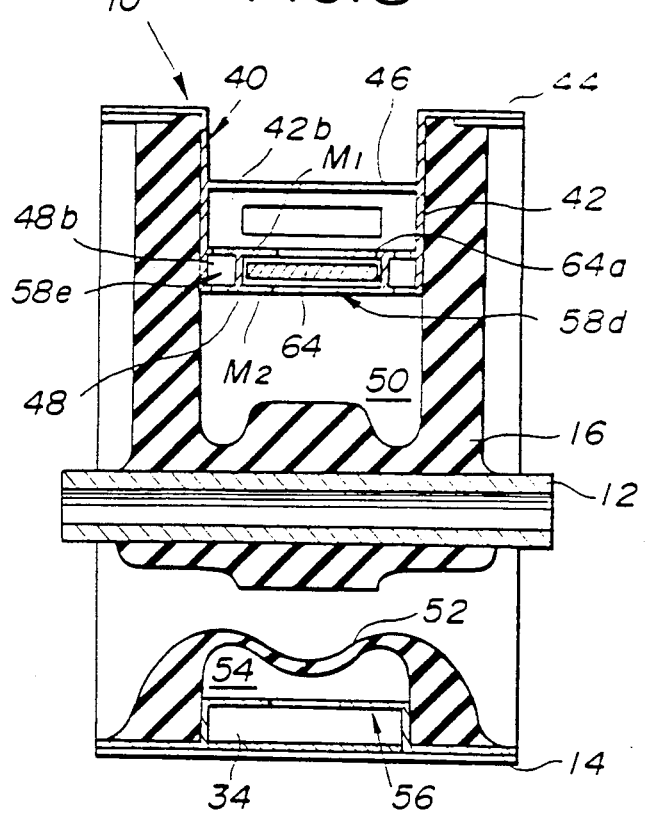
FIG. 8 is a vertical sectional view similar to FIG. 1 but showing a fourth embodiment of the power unit mount of the present invention.

FIG. 8 illustrates a fourth embodiment of the power unit mount 10 according to the present invention similar to the first embodiment. In this embodiment, the box member bottom plate 48 is of the double-wall construction including upper and lower walls $M_1$, $M_2$. A storage chamber 64a is defined between the upper and lower walls $M_1$, $M_2$ to store therein a movable plate 64 made of plastic (synthetic resin) or any elastomeric material. The storage chamber 64a communicates through an opening (no numeral) of the upper wall $M_1$ with the fluid chamber 42b and through an opening (no numeral) of the lower wall $M_2$ with the main fluid chamber 50. Additionally, a plurality of communication openings 48b are formed outside the storage chamber 64a to establish communication between the main fluid chamber 50 and the fluid chamber 42b. Accordingly, with this arrangement, one auxiliary vibration damping mechanism 58d having a vibration damping region on a relatively high frequency side is constituted by fluid communication between the fluid chambers 50, 42b through the storage chamber 64a storing therein the movable plate 64, while another auxiliary vibration damping mechanism 58e having another vibration damping region on a relatively low frequency side is constituted by fluid communication between the fluid chambers 50, 42b through the communication openings 48b.

Figure 9:
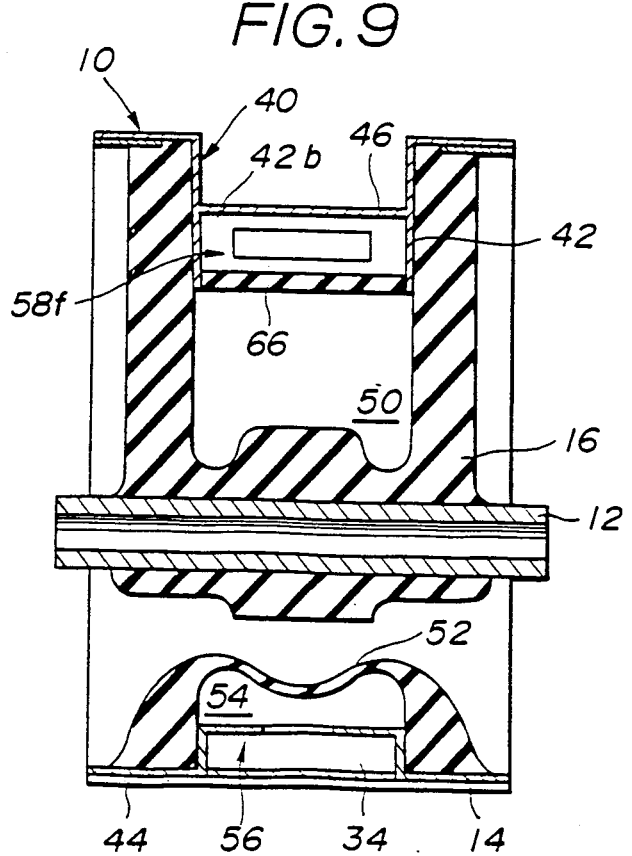
FIG. 9 is a vertical sectional view similar to FIG. 1 but showing a fifth embodiment of the power unit mount of the present invention.

FIG. 9 illustrates a fifth embodiment of the power unit mount 10 according to the present invention similar to the first embodiment with the exception that a diaphragm 66 is used in place of the box member bottom plate 48. In this embodiment, the main fluid chamber 50 and the fluid chamber 42b are separate from each other by the diaphragm 66. Accordingly, the diaphragm 66 flexibly vibrates and constitutes the auxiliary vibration damping mechanism 58f exhibiting vibration damping effect in a relatively high frequency region. In this embodiment, in a low frequency region in which the main vibration damping mechanism 56 functions, the diaphragm 66 largely deforms so that the generally same pressure change as in the main fluid chamber 50 occurs in the fluid chamber 42b communicated with the orifice passage 34. This enables fluid passage within the orifice passage 34 to flow, thereby providing no problem in the function of the main vibration damping mechanism 56.

FIG. 10 illustrates a sixth embodiment of the power unit mount 10 according to the present invention, similar to the fifth embodiment with the exception that a mass member 68 is securely attached to the central part of the diaphragm 66 of the power unit mount 10 in FIG. 9 thereby to constitute the auxiliary vibration damping mechanism 58g. Accordingly, with this configuration, a further vibration transmissibility reduction can be accomplished under resonance effect caused by the diaphragm 66 and the mass member 68.

FIG. 11 illustrates a seventh embodiment of the power unit mount 10 in accordance with the present invention, similar to the first embodiment. In this embodiment, a diaphragm 70 is securely attached to the inner peripheral surface of the upper-most part of the closure body box member 42 in such a manner as to cover the opening of the box member 42. The diaphragm 70 is located above the lid plate 46 to define a diaphragm chamber 72 therebetween. The lid plate 46 is formed with an opening 46a which serves with the opening 48a of the bottom plate 48 as an orifice for communicating the main fluid chamber 50 and the diaphragm chamber 72. Thus, the diaphragm 70 and the orifice (46a, 48a) constitute the auxiliary vibration damping mechanism 58h. Accordingly, with this configuration, the main vibration damping mechanism 56, of course, functions in a low frequency vibration region, and the auxiliary vibration damping mechanism 58h contributes to vibration damping tuning in a relatively high frequency region. This embodiment can increase width of tuning of vibation transmissibility by suitably adjusting the sectional area of the openings 48a, 46a and the spring constant of the diaphragm 70.

Figure 12A:
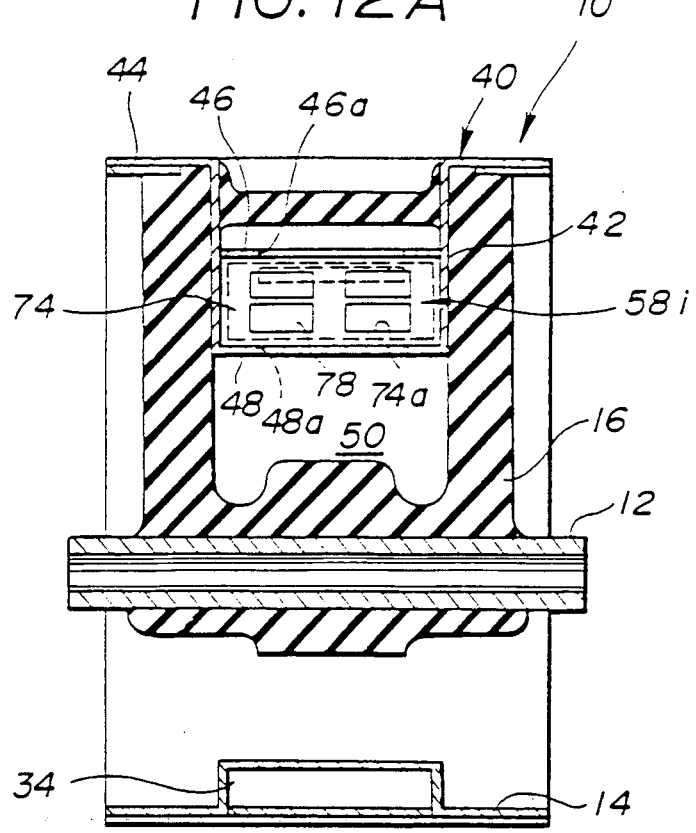
FIG. 12A is a vertical sectional view of an eighth embodiment of the power unit mount of the present invention, taken along a plane parallel with the axis of the power unit mount.
Figure 12B:
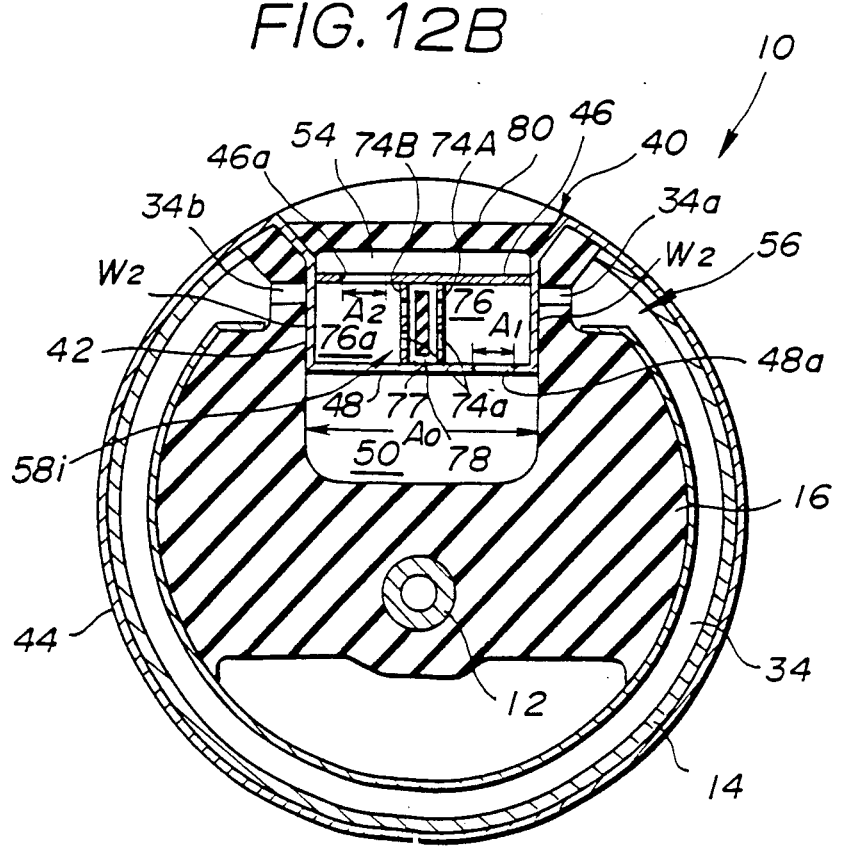
FIG. 12B is a vertical sectional view of the power unit mount of FIG. 12A, taken along a plane to which the axis of the power unit mount is perpendicular.

FIGS. 12A and 12B illustrates an eighth embodiment of the power unit mount 10 according to the present invention, similar to the first embodiment. In this embodiment, two vertical partition wall plates 74A, 74B are securely disposed between the lid plate 46 and the bottom plate 48 of the closure body box member 42 in order to define a first chamber 76 between the first partition wall plate 74A and the rear wall $W_2$ of the box member 42 and a second chamber 76a between the second partition wall plate 74B and the front wall $W_2$ of the box member 42. The two partition wall plates 74A, 74B parallelly extend in the axial direction of the outer cylindrical member 14 and spaced from each other to define therebetween a storage chamber 77. The storage chamber 77 communicate with the first and second chambers 76, 76a through openings 74a formed through the partition wall plates 74A, 74B. A movable plate 78 made of elastic or elastomeric material is disposed within the storage chamber 77 in such a manner that its slight movement is allowed. The movable plate 78 may be made of plastic (synthetic resion) or metal. The bottom plate 48 is formed with a single opening 48a on the side of the first chamber 76, while the lid plate 46 is formed with a single opening 46a on the side of the second chamber 76a.

Additionally, a diaphragm 80 is securely attached to the inner peripheral surface of the upper-most part of the closure body box member 42 in such a manner as to cover the opening of the box member 42. The diaphragm 80 is located above the lid plate 46 to define the auxiliary fluid chamber 54 forming part of the main vibration damping mechanism 56, thus omitting the diaphragm member 52 used in the first embodiment. The main fluid chamber 50 communicates through the opening 48a with the first chamber 76, while the auxiliary fluid chamber 54 communicates through the opening 46a with the second chamber 76a. The orifice passage 34 of this embodiment is formed along the periphery of the outer cylindrical member 14 and extends from the communication opening 34a communicated with the first chamber 76 to the communication opening 34b communicated with the second chamber 76a.

With the thus arranged power unit mount 10, when relative displacement is made between the inner and outer cylindrical members 12, 14 to change the volume of the main fluid chamber 50, the liquid within the main fluid chamber 50 moves through the opening 48a to the first chamber 76 and vice versa. In case exciting force input is of low frequency and large amplitude vibration, the movable plate 78 is pressed against the partition wall plate 74B to close the openings 74a, so that the liquid within the first chamber 76 moves through the orifice passage 34 between the first chamber 76 and the second chamber 76a and then moves from the second chamber 76a to the auxiliary fluid chamber 54 through the opening 46a of the lid plate 46.

Thus, according to this embodiment, tuning of extension elasticity or spring constant of the auxiliary fluid chamber 54 can be independently accomplished from that of the main vibration damping mechanism 56 since the diaphragm 80 defining the auxiliary fluid chamber 54 is disposed separate from the elastic support member 16 as in the first embodiment. Furthermore, the orifice passage 34 extends from the communication opening 34a to the communication opening 34b, and therefore the length of the orifice passage 34 largely increases over that in the first embodiment. This further increases the width of tuning of vibration suppression within a low frequency region. For example, in case the peak frequency in phase variation caused by liquid column resonance in the orifice passage 34 is set at about 10 Hz intending to raise the peak value as high as possible, it has been experimentally confirmed that the orifice passage 34 is required to have an opening sectional area corresponding to a circle having a diameter ranging from 6 to 10 mm. and a length ranging from about 100 to 400 mm. It will be understood that design according to such experimental result can be easily carried out in this embodiment.

In case exciting force input to the power unit mount 10 is of high frequency and small amplitude, fluid passage through the orifice passage 34 is locked; however, pressure variation of the liquid is transmitted between the first and second chambers 76, 76a under vibrational movement of the movable plate 78. As a result, the opening 48a of the bottom plate 48 and the opening 46a of the lid plate 46 serve as an orifice, and therefore a resonance system or the auxiliary vibration damping mechanism 58i is constituted between the main fluid chamber 50 and the auxiliary fluid chamber 54. In this auxiliary vibration damping mechanism 58i, the liquid mass in the openings 48a, 46a as the orifice is relatively small, and therefore resonance range can be set in a high frequency region even if the main and auxiliary fluid chambers 50, 54 of the main vibration damping mechanism 56 are used. The fact that the liquid resonance frequency f in this auxiliary vibration damping mechanism 58i is given by the following equation (2) has been experimentally and theoretically confirmed:

$$f \approx \frac{A_1 \text{ (or } A_2)}{A_0} \cdot \sqrt{K}$$

where $A_0$ is an opening sectional area of the main fluid chamber 50; $A_1$ and $A_2$ are respectively the opening sectional areas of the openings 48a, 46a; and K is the expansion elasticity or spring constant of side wall defining each of the main and auxiliary fluid chambers 50, 54. It will be understood that the vibration damping in a high frequency region can be easily tuned by suitably adjusting $A_1$ or $A_2$.

Thus, also according to this embodiment, the main vibration damping mechanism 56 effectively suppresses input of vibration in a low frequency and large amplitude frequency region such as engine shake and idling vibration to the vehicle body side, and the auxiliary vibration damping mechanism 58i effectively suppresses input of vibration in a high frequency and small amplitude region such as vibration causing booming noise and engine combustion noise to the vehicle body side.

Figure 13:
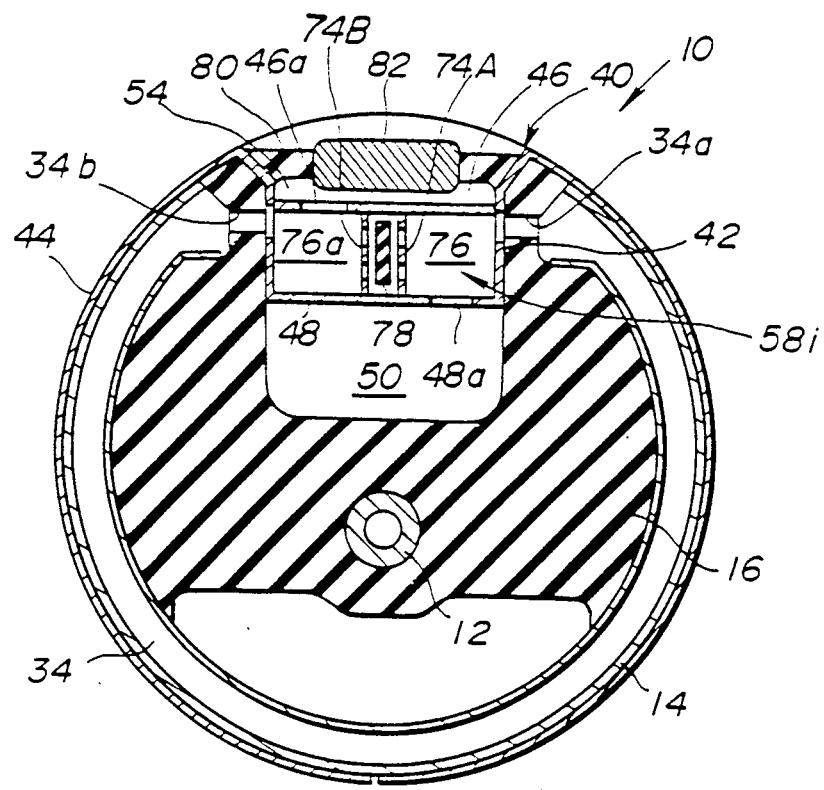
FIG. 13 is a vertical sectional view similar to FIG. 12B but showing a ninth embodiment of the power unit mount of the present invention.

FIG. 13 illustrates a ninth embodiment of the power unit mount 10 according to the present invention, similar to the eighth embodiment of FIGS. 12A and 12B with the exception that a mass member 82 is securely attached to the diaphragm 80. With this arrangement, resonance effect under the action of the diaphragm 80 and the mass member 82 can achieve a further vibration damping transmissibility reduction.

Figure 14:
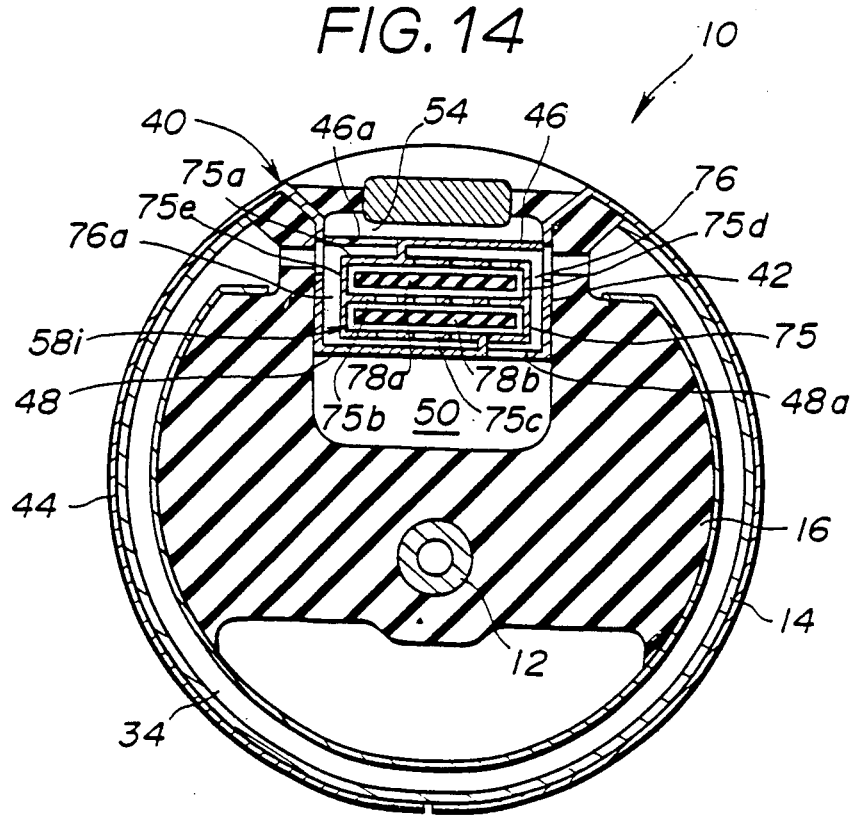
FIG. 14 is a vertical sectional view similar to FIG. 12B but showing a tenth embodiment of the power unit mount of the present invention.

FIG. 14 illustrates a tenth embodiment of the power unit mount 10 according to the present invention, similar to the ninth embodiment with the exception that a partition structure 75 is used in place of the partition wall plates 74A, 74B of FIG. 13. In this embodiment, the partition structure 75 includes upper, middle and lower partition walls 75a, 75b, 75c which are parallel with each other and with the lid and bottom plates 46, 48 of the closure body box member 42. The upper and middle partition plates 75a, 75b are spaced form each other to define therebetween an upper chamber (no numeral) in which a movable plate 78a is movably disposed. The middle and lower partition plates 75b, 75c are spaced from each other to define therebetween a lower chamber (no numeral) in which a movable plate 78b is movably disposed. The movable plates 78a, 78b are made of the same material as of the movable plate 78 of FIG. 12B. The upper partition wall 75a is connected through a connecting partition wall (no numeral) to the lid plate 46, while the lower partition wall 75c is connected through a connecting partition wall (no numeral) with the bottom plate 48. The upper partition wall 75a is formed with a plurality of openings (no numerals) on the side of the first chamber 76 with respect to the connecting partition wall, so that the upper chamber of the partition structure 75 communicates through the openings with the first chamber 76 defined by a side wall 75d of the partition structure 75. The middle partition wall 75b is formed with plurality of openings (no numerals) through which the upper and lower chambers are communicated with each other. The lower partition wall 75c is formed with a plurality of openings (no numerals) located on the side of the second chamber 76 with respect to the connecting partition wall, so that the lower chamber of the partition structure 75 communicates through the openings with the second chamber 76a defined by a side wall 75e of the partition structure 75. Accordingly, the liquid supplied to the first chamber 76 through the box member bottom plate opening 48a is introduced into the partition structure 75 only through the openings in the upper partition wall 75a, while the liquid within the partition structure 75 is discharged out only through the openings in the lower partition wall 75c to the second chamber 76a and then introduced to the auxiliary fluid chamber 54 through the opening 46a in the box member lid plate 46. Thus, this arrangement can, of course, exhibits the same vibration damping function as in the ninth embodiment, and additionally further increases the width of tuning of resonance frequency in a high frequency region.

FIG. 15 illustrates an eleventh embodiment of the power unit mount 10 according to the present invention, similar to the first embodiment with the exception that the diaphragm member 52 is disposed completely separate and independent from the elastic support member 16. In this embodiment, the diaphragm member 52 may be formed of a material different from that of the elastic support member 16.

As discussed above, in the embodiments of the fluid-filled power unit mount according to the present invention, the auxiliary fluid chamber constituting part of the main vibration damping mechanism is disposed separate and independent from the elastic support member disposed between the inner and outer cylindrical members, and therefore the spring constant in extension of the diaphragm member can be independently adjusted regardless of the spring constant or rigidity of the elastic support member. Accordingly, setting the spring constant of the diaphragm member at a much smaller value largely lowers the extension spring constant of the whole main and auxiliary fluid chambers, thereby enabling the liquid column resonance frequency range in the orifice passage to be set in a low frequency region corresponding to engine shake, idling vibration and/or the like caused in the power unit. Thus, vibration transmissibility in this frequency region can be sharply lowered. This prevents or greatly reduces transmission of such engine shake, idling vibration and the like to the vehicle body side, thereby considerably improving ride-on feeling of the vehicle.

Additionally, the power unit mount is provided with at least one auxiliary vibration damping mechanism within the main fluid chamber which mechanism is such set that vibration frequencies to be damped fall within a frequency region different from the corresponding frequency region in the main vibration damping mechanism. Accordingly, tuning damping vibration frequencies of the auxiliary vibration damping mechanism to a relatively high frequency region can prevent or greatly reduce generation of booming noise within a passenger compartment and transmission of combustion noise of an engine to the vehicle body side.

Furthermore, since the inner cylindrical member is disposed inside the outer cylindrical member, the inner cylindrical member is prevented from getting out of the outer cylindrical member even when the elastic support member is broken, thereby avoiding separation of the power unit from the vehicle body. This renders it unnecessary to separately provide a mechanism for preventing such separation of the power unit, thus making the power unit mount itself small-sized and facilitating layout of engine components within a narrow engine compartment.

What is claimed is:

1. A power unit mount for a vehicle, said power unit mount comprising:
   an inner elongate member;
   an outer cylindrical member disposed around said inner elongate member;
   means for applying relative movement of a power unit and a vehicle body between said inner elongate member and said outer cylindrical member;
   an elastic support member securely disposed between said inner elongate member and said outer cylindrical member to support a load of said power unit, said elastic support member being formed with a hollow defining therein a first fluid chamber;
   a diaphragm member disposed to define a second fluid chamber;
   means for locating said first and second fluid chambers adjacent to each other through a vibratable member such that vibration in said first fluid chamber is transmittable to said second fluid chamber, said first and second fluid chambers being respectively located on lower and upper sides of said vibratable member in a direction perpendicular to a horizontal plane passing through an axis of said inner elongate member, said load of said power unit being applied generally perpendicularly to said horizontal plane, said first and second fluid chambers being located above said horizontal plane;
   an orifice passage through which said first and second fluid chambers communicate with each other, said orifice passage extending along an inner periphery of said outer cylindrical member and having a length of over ¾ of a periphery of said outer cylindrical member, said orifice passage forming part of a first vibration damping mechanism for damping vibration in a first frequency region such that said first and second fluid chambers vibratingly communicate with each other through said orifice passage when vibrations are in said first frequency region; and
   a second vibration damping mechanism for damping vibration in a second frequency region different from said first frequency region, said second vibration damping mechanism including said vibratable member and being cooperative with said first fluid chamber such that said first and second fluid chambers vibratingly connect with each other through said vibratable member when vibrations are in said second frequency region.

2. A power unit mount as claimed in claim 1, wherein said inner elongate member is cylindrical and has a longitudinal axis generally parallel with an axis of said outer cylindrical member.

3. A power unit mount as claimed in claim 2, wherein said second vibration damping mechanism includes a hollow box member hermetically disposed in said hollow, said box member having a side wall section formed with an opening communicated with said orifice passage, a lid plate section secured to said side wall section, and a bottom plate section secured to said side wall section and transmitting fluid pressure within said first fluid chamber into space inside of said box member.

4. A power unit mount as claimed in claim 3, wherein said bottom plate section is formed with an opening through which said space inside of said box member communicates with said first fluid chamber.

5. A power unit mount as claimed in claim 3, wherein said bottom plate section has means for defining an elongate orifice passage through which said space inside of said box member communicates with said first fluid chamber.

6. A power unit mount as claimed in claim 3, further comprising a third vibration damping mechanism incorporated with said bottom plate section, said third vibration damping mechanism including a valve member movable relative to said bottom plate section.

7. A power unit mount as claimed in claim 3, wherein said bottom plate section includes first and second plate members, an orifice passage through said first and second plate members, said orifice forming part of said second vibration damping mechanism, a chamber independent of said orifice and communicating with said first fluid chamber and with said space inside of said box member, and a movable plate member movably disposed within said independent chamber.

8. A power unit mount as claimed in claim 3, wherein said bottom plate section includes a diaphragm movable in response to fluid pressure variation in said first fluid chamber.

9. A power unit mount as claimed in claim 8, further comprising a mass member secured to said diaphragm.

10. A power unit mount as claimed in claim 3, wherein said diaphragm member is hermetically connected to said box member and is located above said lid plate section, said lid plate section being formed with an opening through which said chamber communicates with said space inside of said box member.

11. A power unit mount as claimed in claim 3, wherein said diaphragm member is hermetically connected to said box member to define said second fluid chamber between said diaphragm member and said lid plate section, and further comprising partition means for separating said space inside of said box member into first and second chambers, said first chamber and second chamber being communicated with each other through said orifice passage, said first chamber communicating with said first fluid chamber, said second chamber communicating with said second fluid chamber, said partition means including means for establishing communication between said first and second chambers, and means for blocking said communication in response to fluid movement within said second chamber.

12. A power unit mount as claimed in claim 11, wherein said partition means includes first and second partition wall plates disposed within said box member and spaced from each other to define therebetween a third chamber, each of first and second partition wall plates being formed with a plurality of openings through which said third chamber communicates with said first and second chambers, and a movable plate movably disposed within said third chamber.

13. A power unit mount as claimed in claim 12, further comprising a mass member securely attached to said diaphragm member.

14. A power unit mount as claimed in claim 11, wherein said partition means includes first, second and third partition plates disposed within said box member, said first and second partition plates being spaced from each other to define therebetween a third chamber communicated with said first chamber, said second and third partition plates being spaced from each other to define therebetween a fourth chamber communicated with said third chamber and said second chamber, and first and second movable plates disposed respectively in said third and fourth chambers.

15. A power unit mount as claimed in claim 1, further comprising fluid located in said first and second fluid chambers and in said orifice passage.

16. A power unit mount as claimed in claim 1, wherein said elastic support member is secured to said inner periphery of said outer cylindrical member such that said inner elongate member pierces and is embedded in said elastic support member.

17. A power unit mount as claimed in claim 1, wherein said diaphragm member is secured to said inner periphery of said outer cylindrical member.

18. A power unit mount as claimed in claim 1, further comprising orifice passage forming means for forming said orifice passage along said periphery of said outer cylindrical member, said orifice passage forming means including means for defining a groove on an outer surface of said outer cylindrical member, said groove extending in a peripheral direction of said outer cylindrical member, and means for hermetically covering said groove to define said orifice passage inside said groove.

19. A power unit mount as claimed in claim 1, wherein said second fluid chamber is located generally opposite to said hollow with respect to said inner elongate member.

20. A power unit mount as claimed in claim 1, wherein said inner elongate member is connected to one of said power unit and said vehicle body, said outer cylindrical member being connected to the other of them.

21. A power unit mount as claimed in claim 1, wherein said inner elongate member is connected to said power unit, and said outer cylindrical member is connected to said vehicle body.

22. A power unit mount as claimed in claim 1, wherein said second frequency region is higher than said first frequency region.

23. A power unit mount as claimed in claim 1, wherein said first frequency region is from 5 Hz to 40 Hz.

24. A power unit mount as claimed in claim 1, wherein said second frequency region is from 100 Hz to 400 Hz.

* * * * *